United States Patent [19]
Ito et al.

[11] Patent Number: 5,118,948
[45] Date of Patent: Jun. 2, 1992

[54] GAMMA CAMERA DEVICE

[75] Inventors: Yukinobu Ito, Nishinasunomachi; Akira Tsukamoto, Ootawara; Nobutoshi Nakayama, Tokyo; Kazuhiro Tsuda, Ootawara, all of Japan

[73] Assignee: Kabushiki Kaisha Toshiba, Kawasaki, Japan

[21] Appl. No.: 494,183

[22] Filed: Mar. 14, 1990

[30] Foreign Application Priority Data

| Mar. 16, 1989 [JP] | Japan | 1-62054 |
| Apr. 4, 1989 [JP] | Japan | 1-84044 |
| Apr. 14, 1989 [JP] | Japan | 1-93093 |
| Apr. 14, 1989 [JP] | Japan | 1-93094 |

[51] Int. Cl.⁵ .............................. G01T 1/164
[52] U.S. Cl. .................... 250/369; 250/363.02; 364/413.24
[58] Field of Search .............. 250/369, 363.02; 364/413.24

[56] References Cited

U.S. PATENT DOCUMENTS

| 4,434,369 | 2/1984 | Metal | 250/369 |
| 4,672,542 | 6/1987 | Roux et al. | 250/369 |
| 4,945,241 | 7/1990 | Yamashita et al. | 250/367 |
| 5,012,082 | 4/1991 | Watanabe | 250/349 |

FOREIGN PATENT DOCUMENTS

| 0002540A2 | 6/1979 | European Pat. Off. | 250/363.02 |
| 0155463A1 | 9/1985 | European Pat. Off. | 250/363.02 |
| 0240689A1 | 10/1987 | European Pat. Off. | 250/363.02 |

OTHER PUBLICATIONS

Seeger, P. A., A Fast Parallel Encoding Scheme for the Anger Camera, IEEE Transactions on Nuclear Science, vol. NS-31, No. 1, Feb. 1984, pp. 274-280, New York, U.S.

Primary Examiner—Carolyn E. Fields
Assistant Examiner—Drew A. Dunn
Attorney, Agent, or Firm—Finnegan, Henderson, Farabow, Garrett, and Dunner

[57] ABSTRACT

A radiation ray (gamma ray) radiated from a test subject previously dosed with radioisotope is incident on a scintillator and converted into scintillation light. A plurality of photomultipliers arranged in a hexagon receive and convert the scintillation light into electrical signals. Photomultipliers arranged in parallel with sides of the hexagon constitute a group. Output signals of the photomultipliers are supplied to a first position detector for detecting a group of photomultipliers which receives the scintillation light and deriving position information Xo and Yo representing the approximate gamma ray incident position. The position information Xo and Yo and the output signals of the photomultiplier are supplied to a second position detector for deriving position information x and y representing the precise gamma ray incident position. Outputs of the photomultiplier are supplied to a pulse height analyzer which derives incident radiation energy information z.

9 Claims, 13 Drawing Sheets

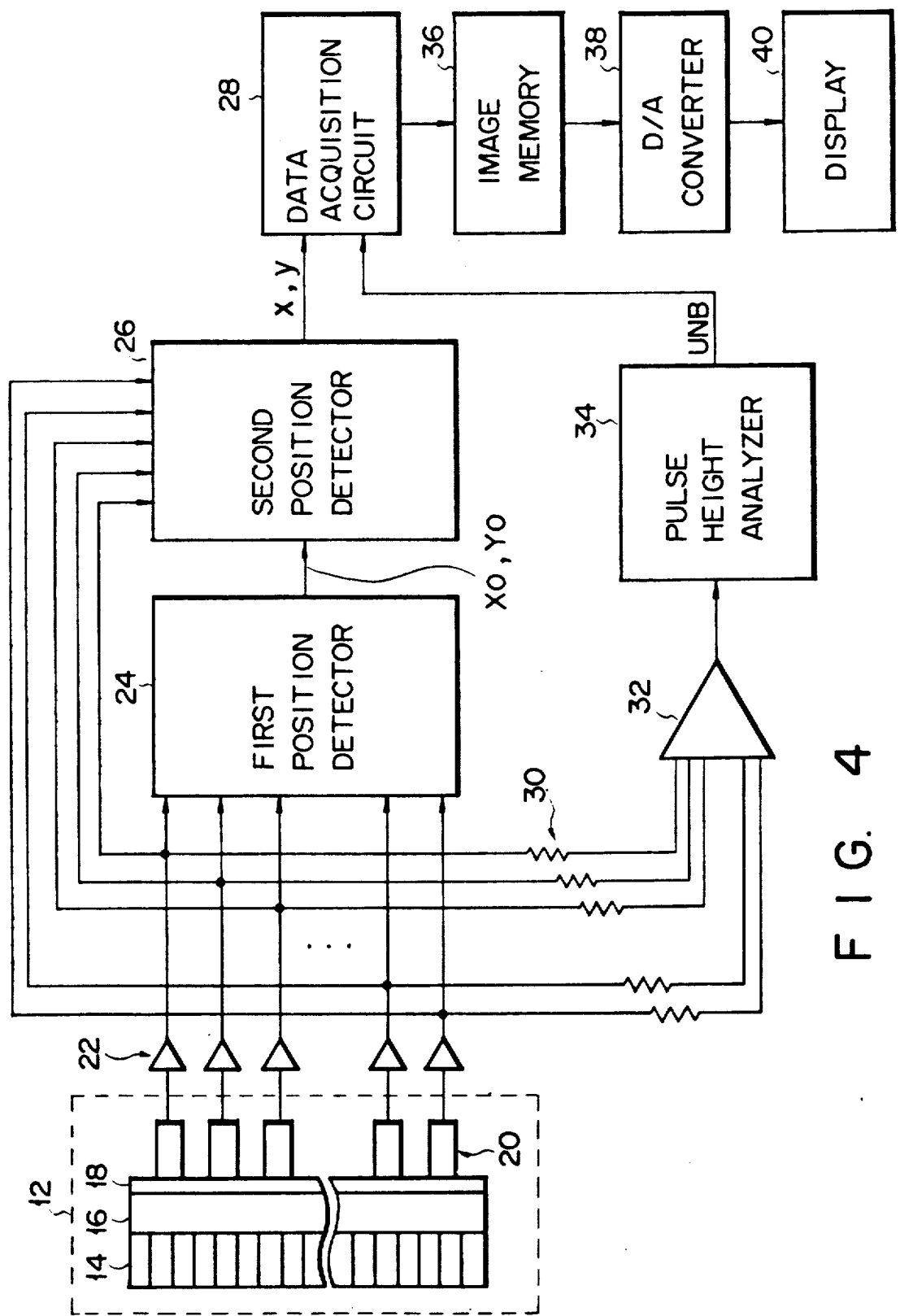
F I G. 4

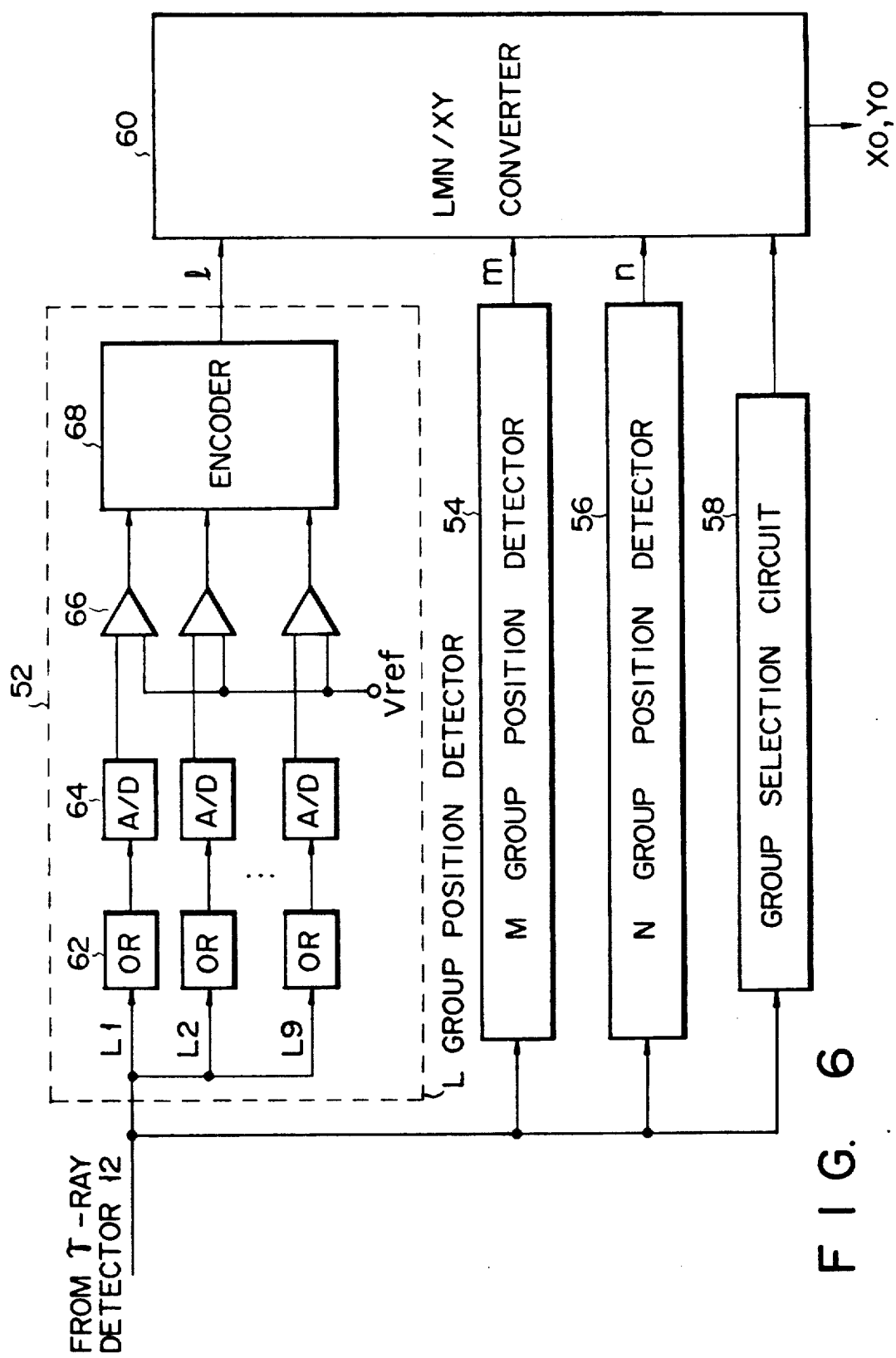
F I G. 6

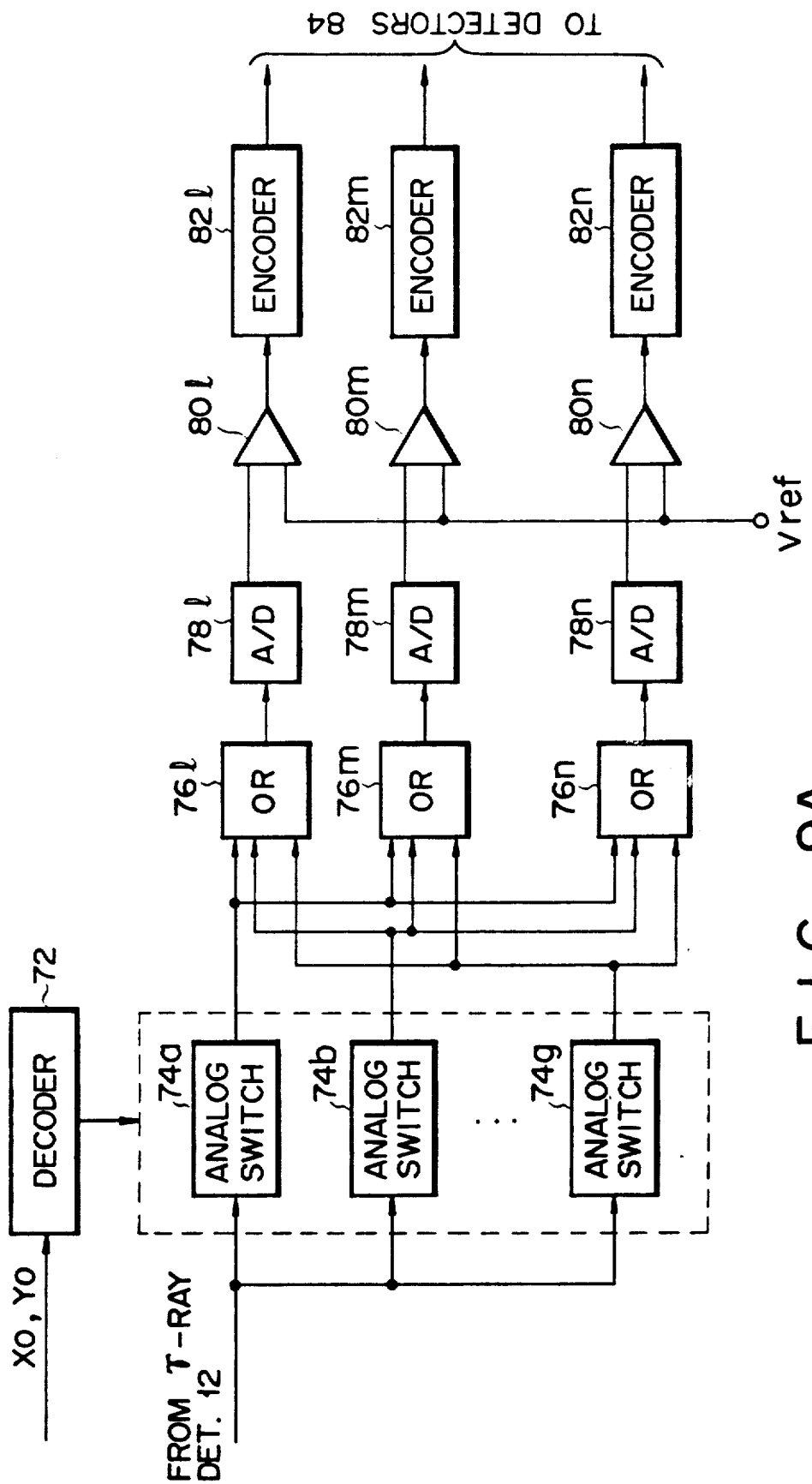
F I G. 9A

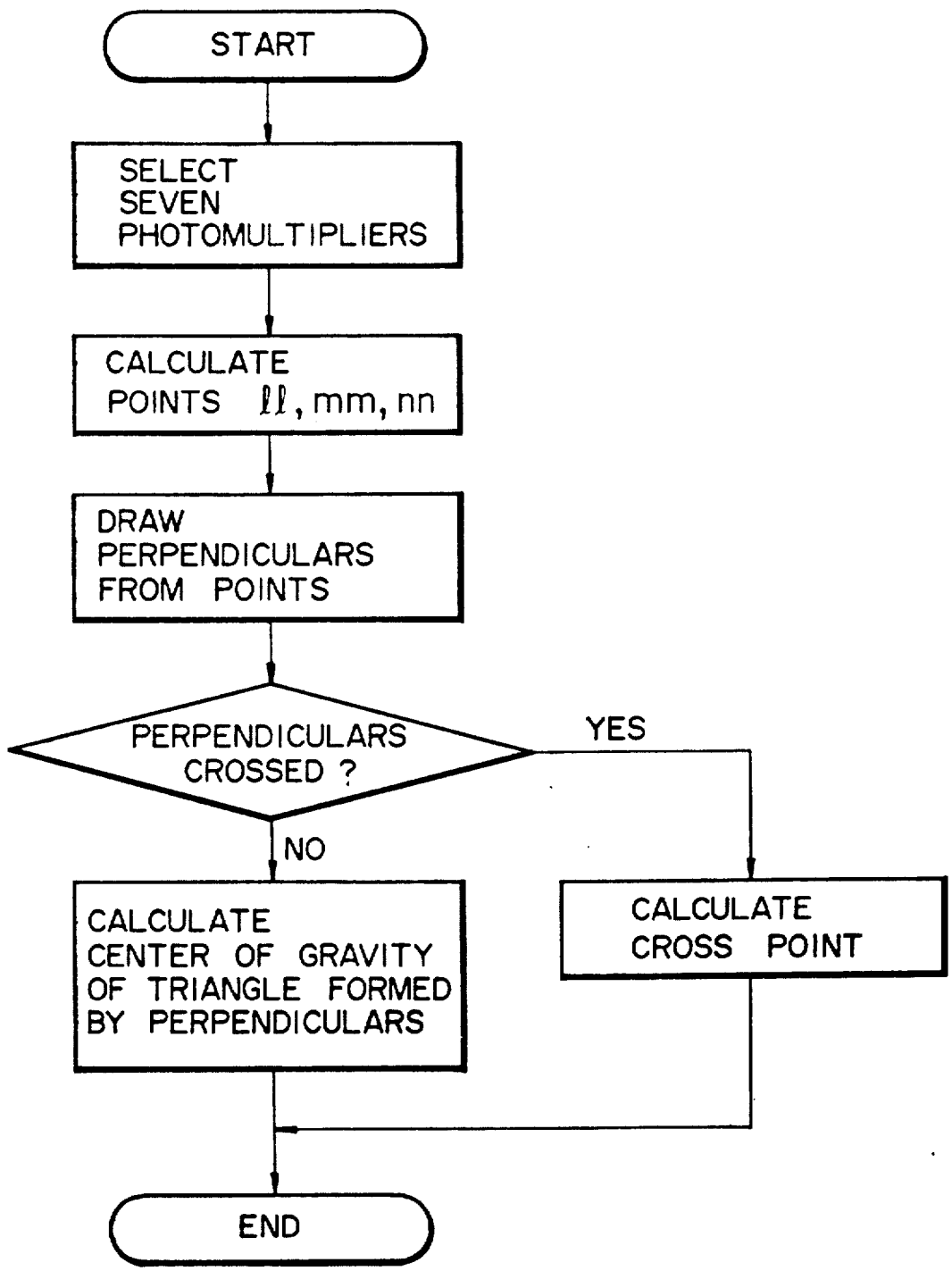
F I G. 11

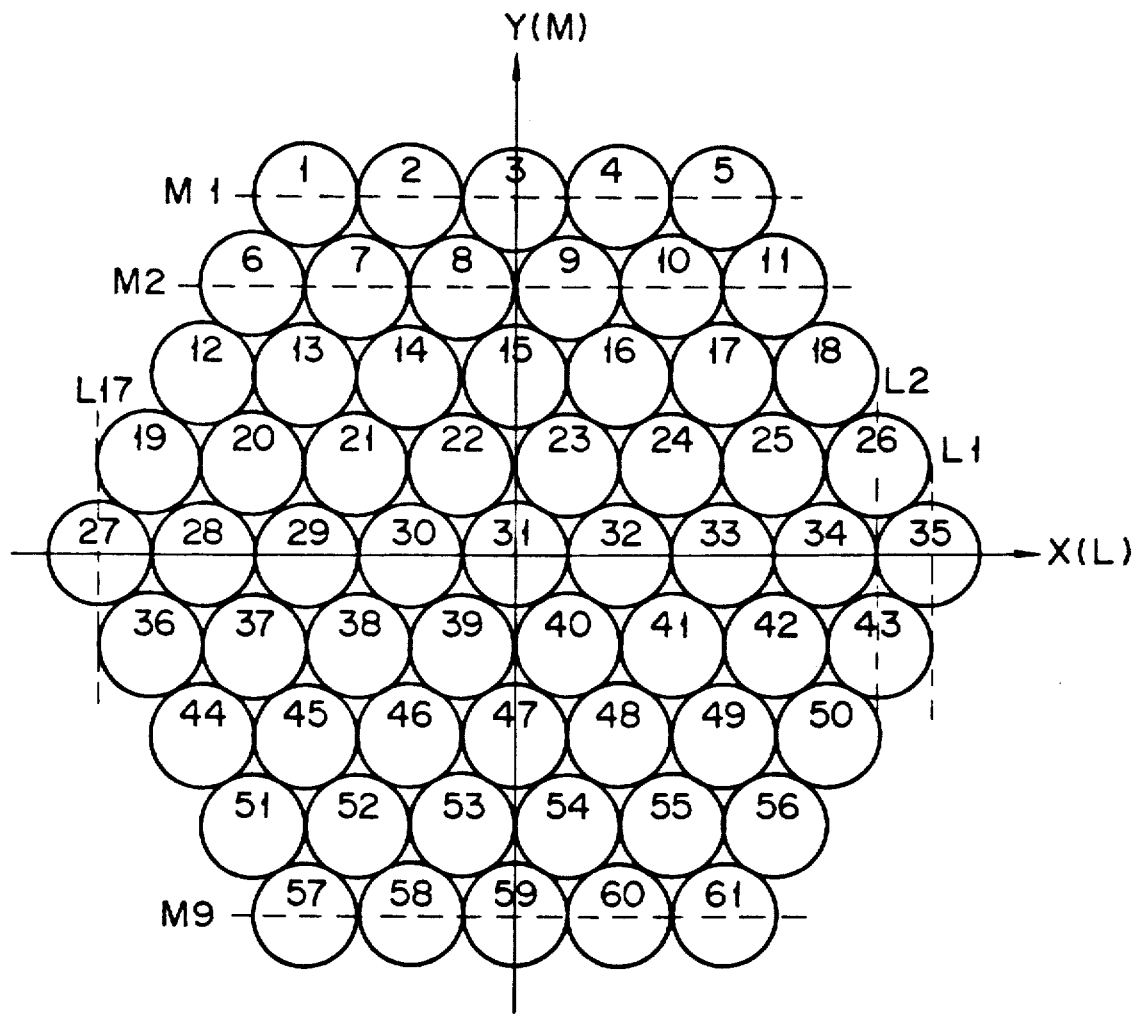
F I G. 12

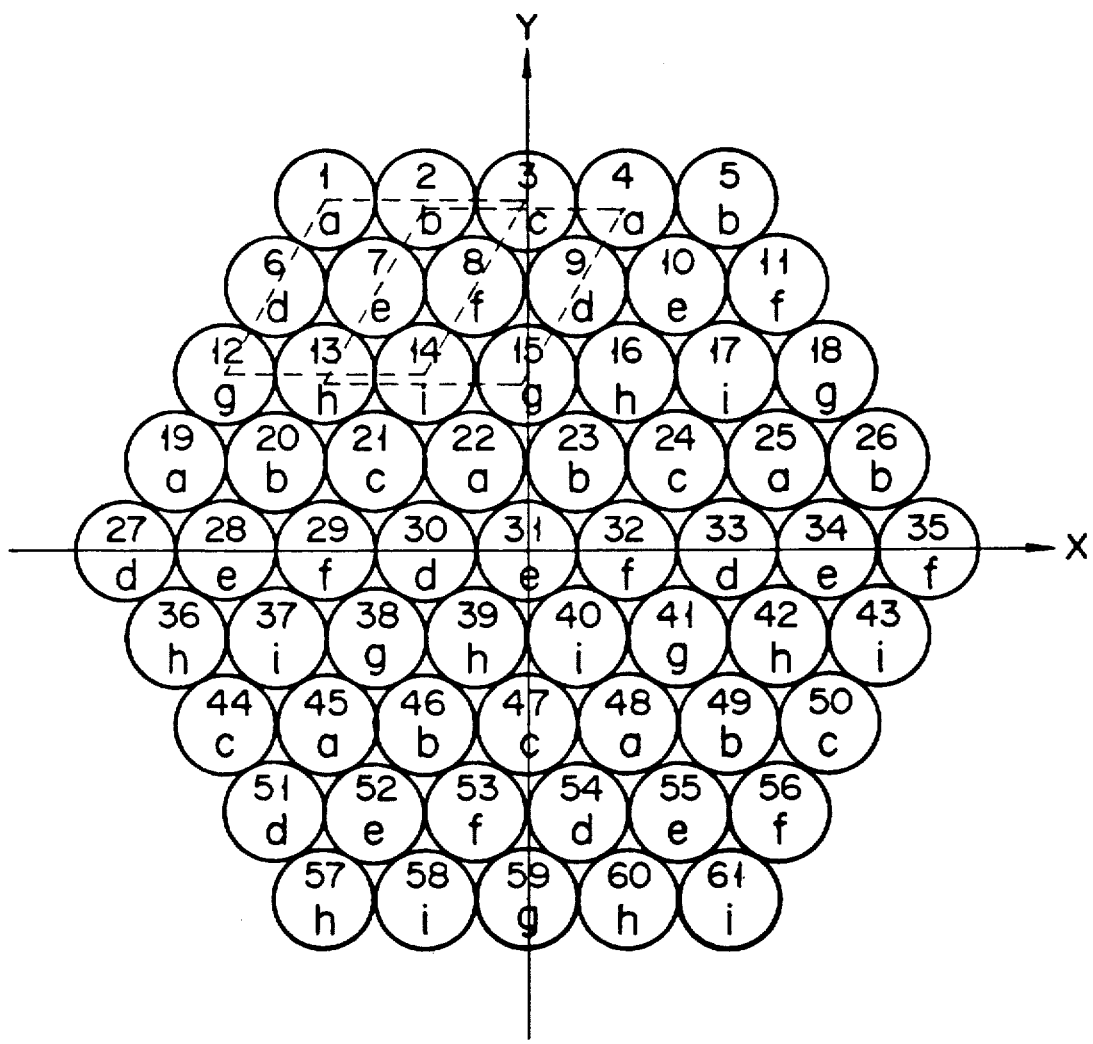
F I G. 13

GAMMA CAMERA DEVICE

BACKGROUND OF THE INVENTION

1. Field of the Invention

This invention relates to a gamma camera for providing an image representing the radioisotope (which is hereinafter referred to as RI) distribution in a test subject previously dosed with radioisotope, and more particularly to an improvement of a position detector for calculating a radiation ray incident position.

2. Description of the Related Art

The general construction of the conventional gamma camera is shown in FIG. 1. The gamma camera includes a scintillator 1 for receiving a radiation ray (gamma ray) radiated from a test subject previously dosed with radioisotope and emitting scintillation light corresponding to the received gamma ray. The scintillator 1 is optically coupled to the light receiving surface of a plurality of photomultipliers 2 for converting the received scintillation light into an electrical signal. The scintillator 1 and photomultipliers 2 constitute a gamma ray detector 9 in cooperation with a collimator and a light guide which are not shown in FIG. 1.

Output signals of the gamma ray detector 9, that is, signals from the photomultipliers 2 are amplified by pre-amplifiers 3 and then supplied to a position detector 4. The position detector 4 derives position data x and y representing the incident position or emitting position of the radiation ray receiving surface of the scintillator 1, on which the gamma ray is incident or from which the scintillation light is emitted.

For example, the position detector 4 is formed of a weighting circuit using a resistor matrix so as to derive four parameters $X^+$, $X^-$, $Y^+$ and $Y^-$ in the X-Y orthogonal coordinate system having the center of the radiation ray receiving surface of the scintillator 1 as an origin thereof as well as a parameter Zdiv. Then, the position detector 4 determines radiation ray incident position data x and y based on these parameters as follows:

$$x = (X^+ - X^-)/Zdiv \quad (1)$$

$$y = (Y^+ - Y^-)/Zdiv \quad (2)$$

Output signals of the photomultipliers 2 are also supplied to an additional amplifier 6 via variable resistors 5, added together therein, and then supplied to a pulse height analyzer 7. The pulse height analyzer 7 derives radiation ray energy data Zspc and supplies the same to a display unit 8. When the energy level is larger than an upper limit value or smaller than a lower limit value, the pulse height analyzer 7 supplies an unblanking signal UNB to the display unit 8. The display unit 8 displays an image representing the RI distribution in the test subject according to the position data x and y, the unblanking signal UNB, and the radiation energy data Zspc.

A problem occurring in the conventional gamma camera described above is that a plurality of gamma rays are received at the same time by the scintillator 1. The probability that a plurality of gamma rays are incident on the scintillator 1 at the same time becomes higher as the mean incident rate becomes higher. In this case, since the gamma ray incident position on the scintillator 1 is derived by the position detector 4 which is formed by the weighting circuit using the resistor matrix, the incident position is derived as the central position or the mean point of a plurality of incident positions. That is, the incident position is erroneously derived. Since the erroneous calculation may occur more frequently in the central portion of the detector 9, a profile becomes a convex portion in the center of the detector and the contrast of the image becomes irregular in the case of the RI diagnosis of high counting rate.

Further, since the cross section of each of the photomultipliers 2 is circular, a large number of photomultipliers may be arranged in a hexagonal configuration so as to minimize the space between the photomultipliers. FIG. 2 shows an example of the arrangement of the photomultipliers of the conventional gamma camera. In this example, 61 photomultipliers are closely arranged in a hexagonal configuration.

In this case, if the weighted values W1 to W5 given to the first to fifth (No. 1 to No. 5) photomultipliers on the first row of the hexagonal array are set such that $W1 = -2$, $W2 = -1$, $W3 = 0$, $W4 = +1$ and $W5 = +2$ and a gamma ray is incident on the position indicated by an arrow of broken line as shown in FIG. 3, then the incident position data x in the X-axis direction can be obtained as follows:

$$\begin{aligned}
x &= (A1 \cdot W1 + A2 \cdot W2 + \\
&\quad A3 \cdot W3 + A4 \cdot W4 + A5 \cdot W5)/ \\
&\quad (A1 + A2 + A3 + A4 + A5) \\
&= \{0 \times (-2) + 10 \times (-1) + \\
&\quad 65 \times 0 + 65 \times 1 + 10 \times 2\}/ \\
&\quad (0 + 10 + 65 + 65 + 10) \\
&= 0.5
\end{aligned} \quad (3)$$

where A1 to A5 indicate output pulse heights of the No. 1 to No. 5 photomultipliers.

FIG. 3 shows only the photomultipliers arranged along the X-axis direction but the incident position data y in the Y-axis direction ca be derived in the same manner.

In this case, when the gamma ray is incident on a position inside the photomultiplier array and all the six photomultipliers surrounding the incident position are present, no problem occurs. However, when the gamma ray is incident on the peripheral portion of the array and not all the six photomultipliers surrounding the incident position are present, the pulse height of the outer photomultiplier is 0 so that the calculation for deriving the incident position will be effected based on unbalanced factors. As a result, the position derived is slightly shifted in a inward direction with respect to the actual position. If an RI distribution image is provided based on such position data, it may be distorted on the peripheral portion thereof.

SUMMARY OF THE INVENTION

An object of this invention is to provide a gamma camera which detects a precise radiation ray incident position even when a plurality of radiation rays are generated from the test subject at the same time.

Another object of this invention is to provide a gamma camera which forms an RI distribution image whose peripheral portion is not distorted.

A gamma camera device according to this invention comprises a radiation ray detector including a plurality of photomultipliers for receiving a radiation ray radiated from a test subject, a first position detector for detecting a first photomultiplier on which the radiation ray is incident based on outputs from the photomultipliers, and a second position detector for detecting the precise incident position of the radiation ray on the radiation ray detector based on outputs of the first photomultiplier and a group of second photomultipliers which are arranged around the first photomultiplier.

According to the gamma camera of this invention, the incident position of the radiation ray is roughly determined by the first position detector and then the incident position is precisely derived based on the output signals of the photomultiplier arranged at the roughly determined incident position and a predetermined photomultipliers arranged around the roughly determined incident position. Therefore, the precise incident position can be detected even if a plurality of radiation rays are generated at the same time and an RI distribution image whose peripheral portion is not distorted can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiments given below, serve to explain the principles of the invention.

FIG. 4 is a block diagram of a gamma camera according to an embodiment of the present invention;

FIG. 6 is a block diagram showing the detailed construction of the first position detector;

FIGS. 9A and 9B are block diagrams showing the detailed construction of the second position detector;

FIG. 11 is a flowchart showing the operation of the second position detector;

FIG. 12 is a diagram showing groups of photomultipliers in a modified first position detector; and FIG. 13 is a diagram showing blocks of photomultipliers in a modified second detector.

DETAILED DESCRIPTION OF THE PREFERRED EMBODIMENTS

Figure 1:
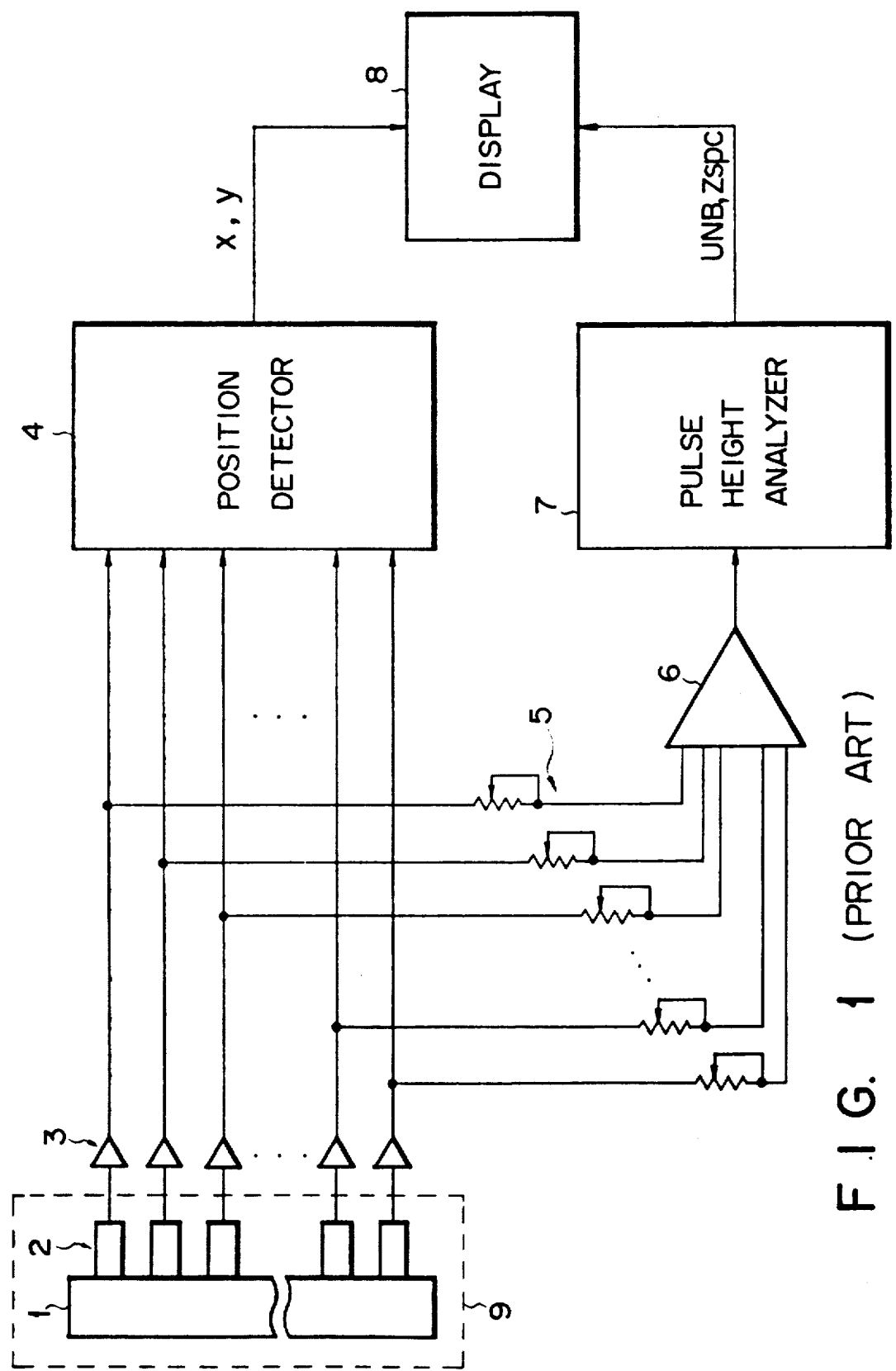
FIG. 1 is a block diagram showing a prior art gamma camera.
Figure 2:
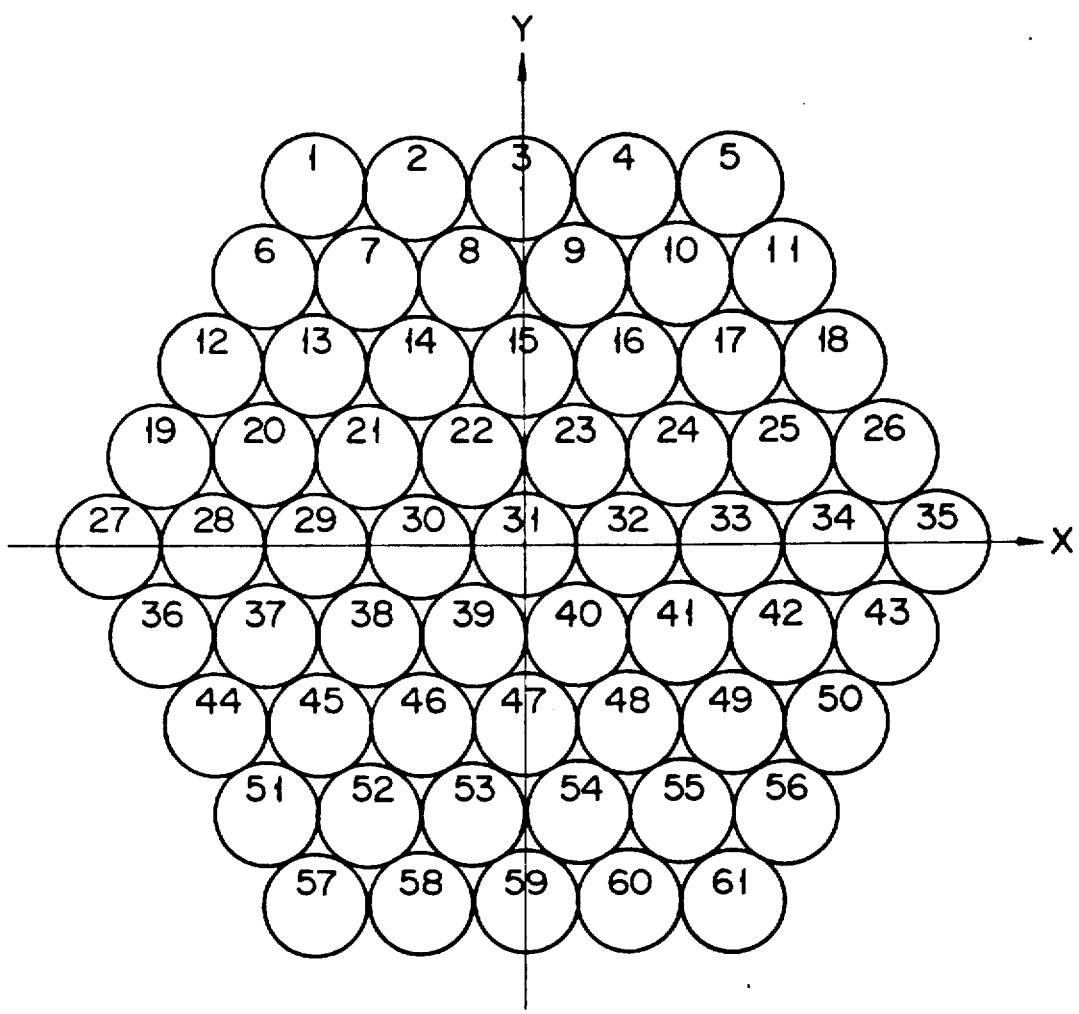
FIG. 2 is a diagram showing the arrangement of the photomultipliers in a prior art gamma camera.
Figure 3:
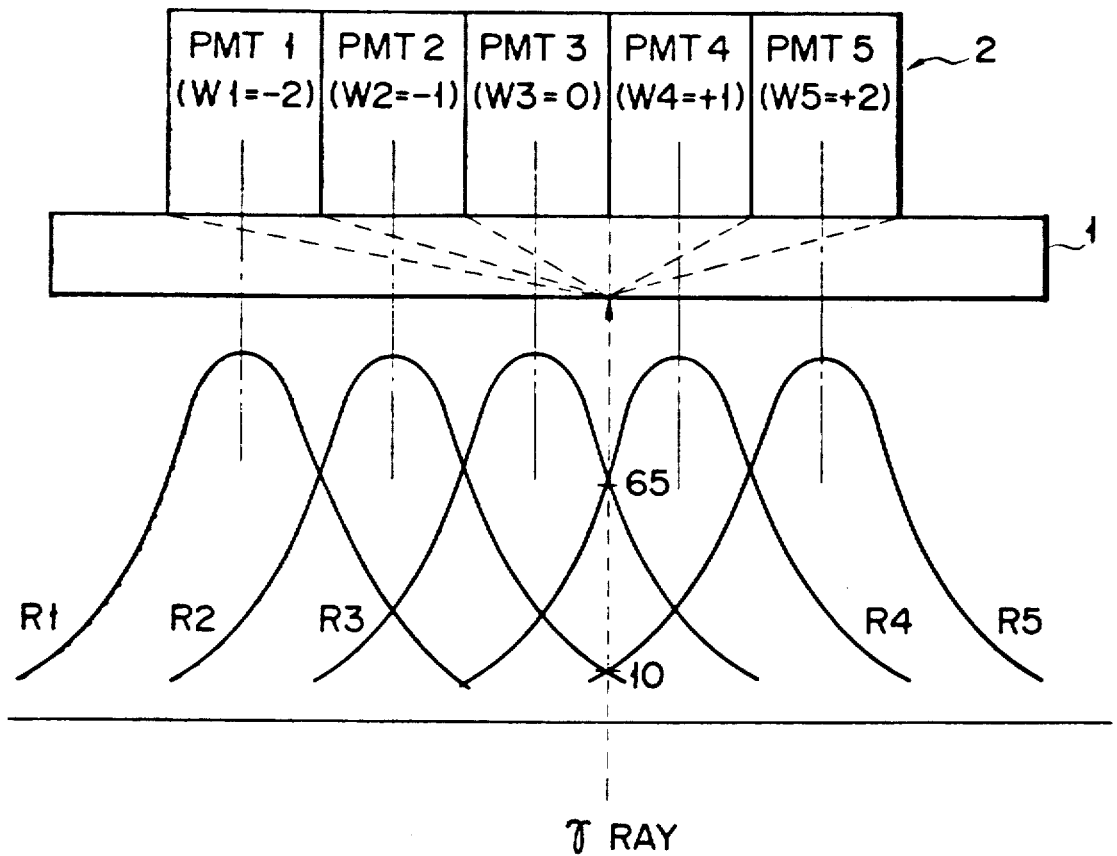
FIG. 3 is a diagram showing the principle of the gamma ray incident position deriving calculation in a prior art gamma camera.

There will now be described an embodiment of a gamma camera according to the present invention with reference to the accompanying drawings. FIG. 4 is a block diagram showing the construction of the embodiment. A detector 12 which detects a radiation ray (gamma ray) radiated from a test subject previously dosed with radioisotope is provided. The detector 12 includes a collimator 14 which permits only the gamma ray received along a predetermined incident direction to pass therethrough, a scintillator 16 for converting the gamma ray which has passed the collimator 1 into scintillation light, and a plurality of photomultipliers 20 for receiving scintillation light transmitted from the scintillator 16 via a light guide 18 and converting the received scintillation light into an electrical signal.

Figure 5:
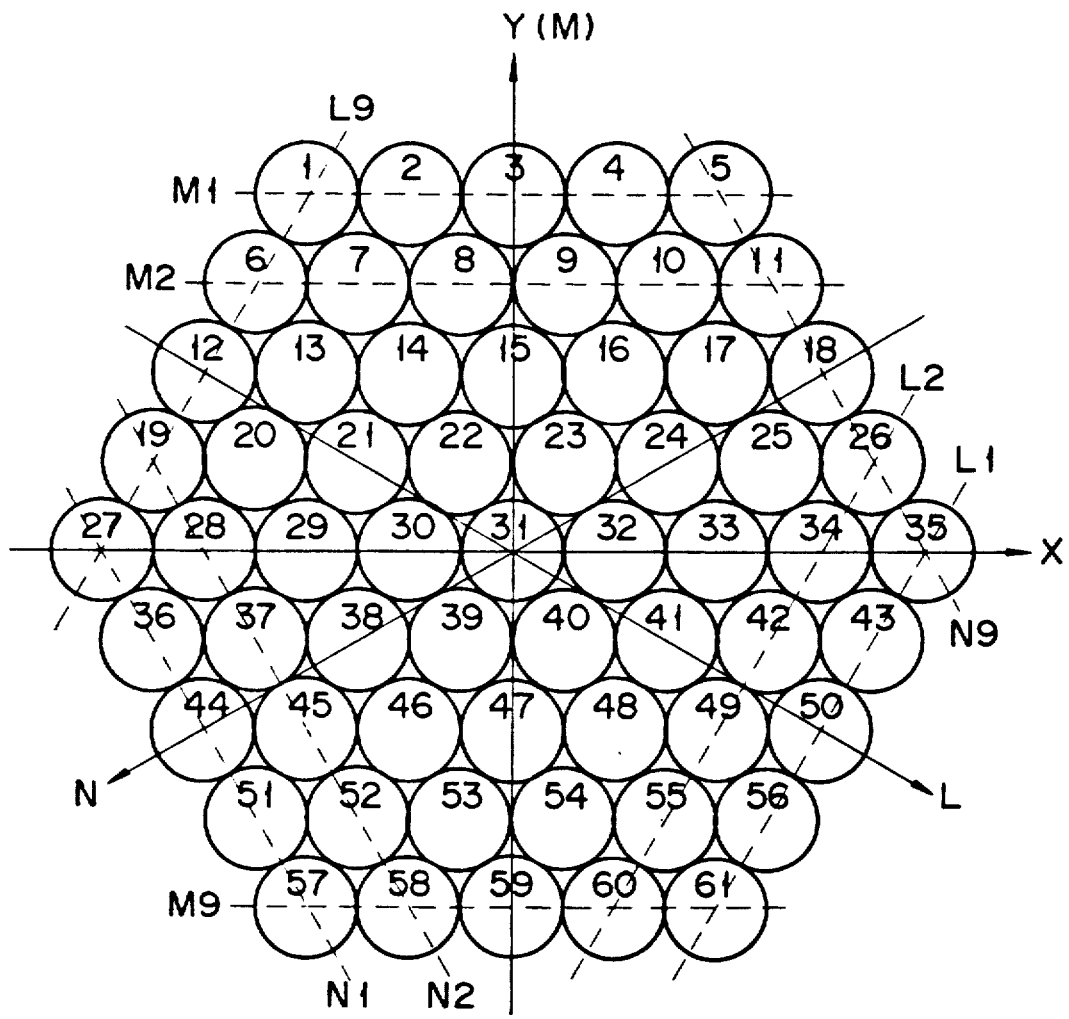
FIG. 5 is a diagram showing groups of photomultipliers for illustrating the operation of a first position detector in the above embodiment.

As shown in FIG. 5, each of the photomultipliers 20 has a circular cross section and in this embodiment 61 photomultipliers are arranged in a hexagonal configuration. The 61 photomultipliers are classified into groups with regard to three coordinate axes L, M (=Y-axis) and N of $-30°$, $90°$ and $210°$ so as to derive a first position representing the approximate gamma ray incident position. Those photomultipliers having the same L, M, or N coordinate value, that is, those photomultipliers which are arranged in parallel with a side of the hexagon, constitute one group. For example, Nos. 35, 43, 50, 56, and 61 photomultipliers constitute a group L1, Nos. 1, 2, 3, 4, and 5 photomultipliers constitute a group M1, and Nos. 27, 36, 44, 51, and 57 photomultipliers constitute a group N1.

Output signals of the photomultipliers 20 ar supplied to a first position detector 24 via preamplifiers 22. The detector 24 derives the first position data Xo and Yo representing the approximate gamma ray incident position (scintillation light generating position) on the scintillator 16. Namely, the first position detector 24 detects groups Ll, Mm and Nn which with regard to the coordinate axes L, M and N, that define the radiation incident position. The first position detector 24 then derives the approximate incident position data Xo and Yo on the X-Y coordinate system based on the positions l, m and n of the detected groups.

The approximate incident position data Xo and Yo and output signals of the photomultipliers 20 are supplied to a second position detector 26 which in turn derives a second position data x and y representing the precise gamma ray incident position. The precise position data x and y are supplied to a data acquisition circuit 28.

The output signals of the photomultipliers 20 are input to an additional amplifier 32 via respective variable resistors 30, added together therein, and then supplied to a pulse height analyzer 34. The pulse height analyzer 34 derives incident radiation energy information z and supplies the same to the data acquisition circuit 28. When the energy level is larger than an upper limit or smaller than a lower limit, the pulse height analyzer 34 supplies UNB signal to the data acquisition circuit 28.

The data acquisition circuit 28 has a two-dimensional memory area whose address is designated by the position data x and y. For example, when position data xl and yl are supplied from the second position detector 26, the data acquisition circuit 28 adds one to data stored in the memory address designated by xl and yl. The same operation is effected each time position data is output from the second position detector 26. When a sufficiently large number of data is collected, image data indicating the RI distribution in the test subject is stored into the memory of the data acquisition circuit 28. In order to derive a display image corresponding to the RI distribution image data, a display memory 36 is used to temporarily store the data and the temporarily stored data is supplied to a display unit 40 via a D/A converter 38.

The detail construction of the first position detector 24 is shown in FIG. 6. The first position detector 24 includes L, M and N group position detectors 52, 54, and 56 for detecting groups Ll, Mm, and Nn which include a photomultiplier receiving the gamma ray, a group selection circuit 58, and an LMN/XY coordinate converter 60. Since the position detector of each group has the same construction, the detail construction of the position detector 52 of only the L group is shown in FIG. 6.

Outputs of the photomultipliers belonging to the L1, L2, ... L9 are supplied to respective OR circuits 62. Outputs of the OR circuits 62 are supplied to comparators 66 via A/D converters 64 respectively. Each comparator 66 compares the output of the OR circuit 62 with a reference signal Vref and supplies the input signal to an encoder 68 when the input signal is larger than the reference signal Vref. The reference signal Vref is used to select those of the outputs of the OR circuits which are larger than a predetermined value and is set to an adequate level according to the type of radioisotope dosed into the test subject. The encoder 68 outputs an index signal l indicating the group Ll among the groups L1 to L9 from which the scintillation light of the highest level is emitted.

Figure 7:
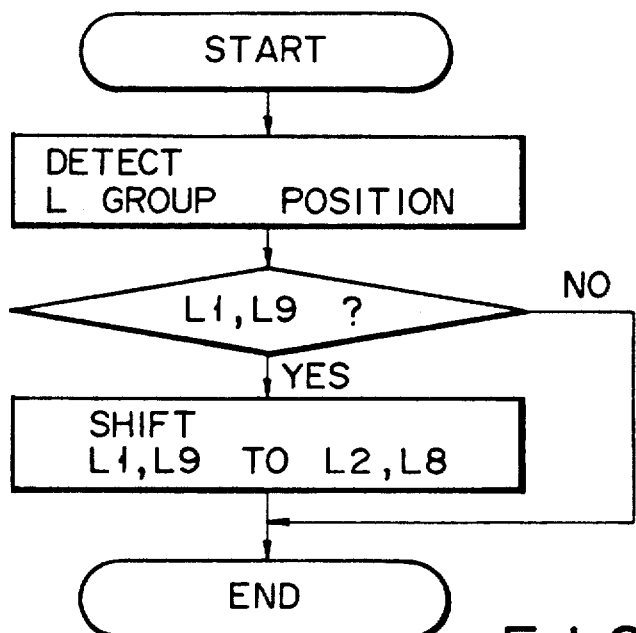
FIG. 7 is a flowchart for illustrating the operation of the first position detector.

The encoder 68 of this embodiment modifies the index signal into the signal indicating the group which is inwardly adjacent to the outermost group when it is detected that the gamma ray is incident on the outermost group of the photomultipliers. If this modification is not done, the RI distribution image is distorted as in the prior art when the gamma ray is incident on a photomultiplier arranged on the periphery of the hexagonal array. For example, when the group L1 or L9 is detected as a group on which the gamma ray is incident, the group L2 or L8 is output as the incident position instead of the group L1 or L9, respectively. In this way, the approximate incident position data output from the first position detector 24 is always subjected to the peripheral correction and as a result no distortion will occur in the peripheral portion of the RI distribution image. The operation of the encoder 68 is shown by the flowchart of FIG. 7.

Likewise, the other group position detectors 54 and 56 output index signals m and n. The group selection circuit 58 selects the groups of the photomultipliers.

Output signals l, m, and n of the group position detectors 52, 54, and 56 and an output of the group selection circuit 58 are supplied to the coordinate converter 60. The coordinate converter 60 converts the approximate incident position data (l, m, n) in the L-M-N coordinate system into approximate incident position data (Xo, Yo) in the X-Y coordinate system. The converter 60 includes a decoder having a table in which the relation between the position data (l, m, n) and the position data (Xo, Yo) is stored.

Figure 8:
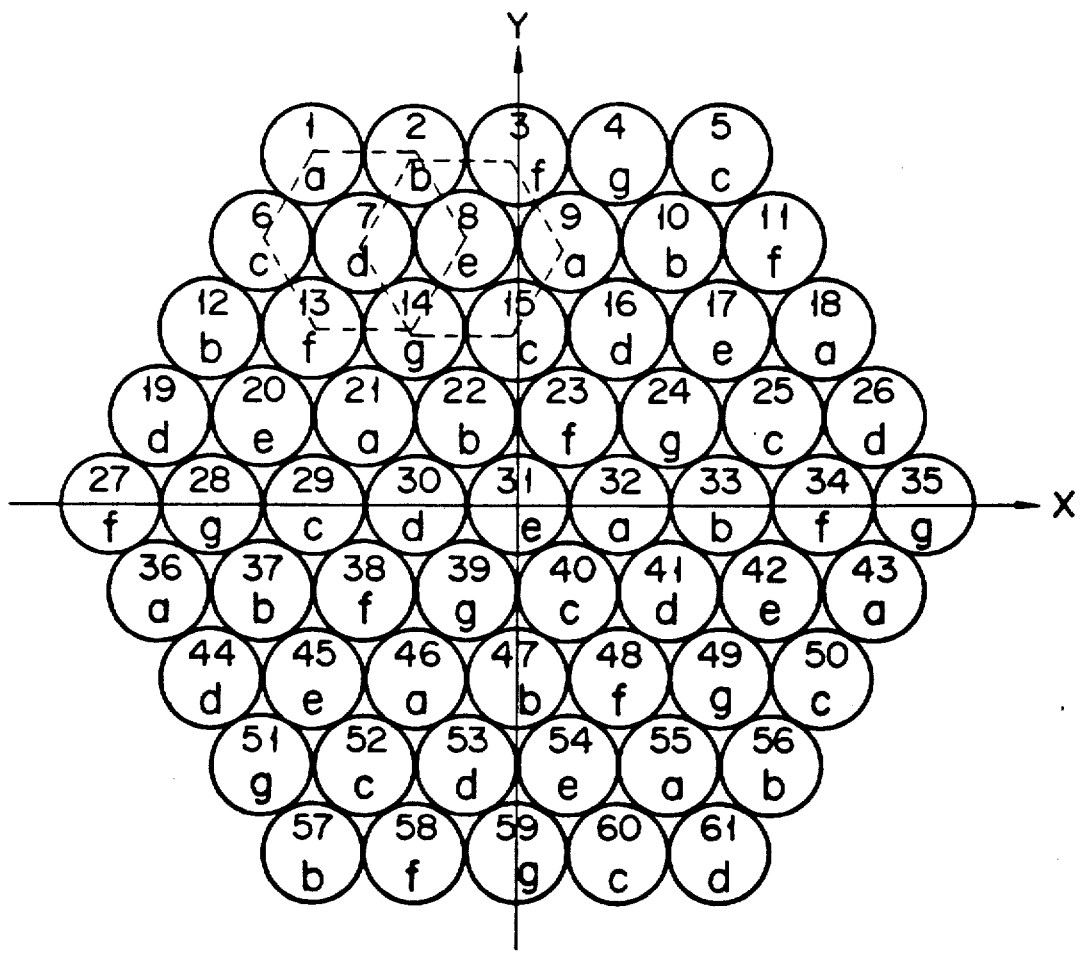
FIG. 8 is a diagram showing blocks of photomultipliers for illustrating the operation of a second position detector of the above embodiment.
Figure 9B:
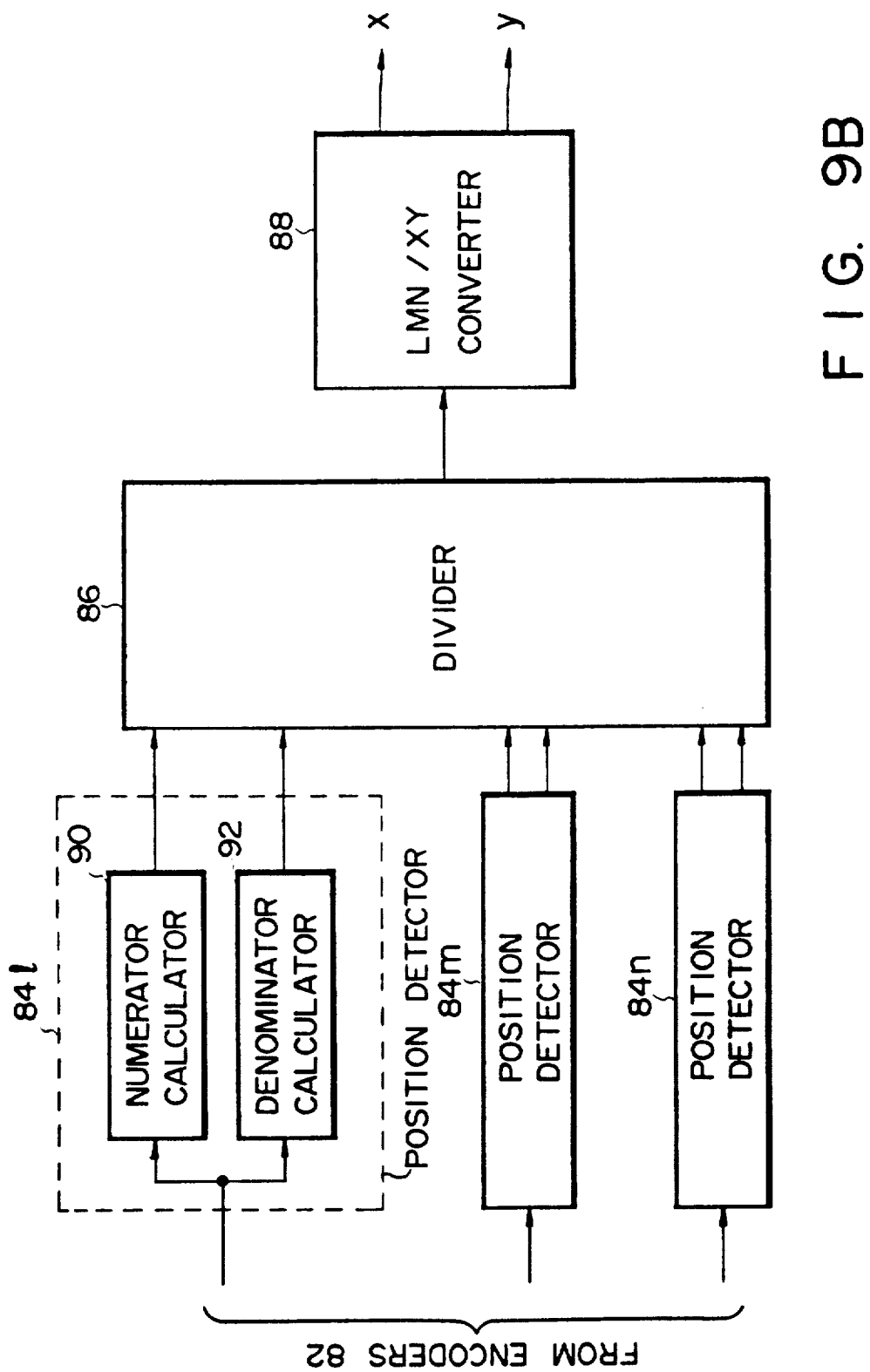

The second position detector 26 is constructed as shown in FIGS. 9A and 9B. Approximate incident position data Xo and Yo are supplied to a decoder 72. The decoder 72 supplies a signal to seven analog switches 74a to 74g in response to the position signals Xo and Yo to select a hexagonal block of seven photomultipliers including a photomultiplier which lies in the position defined by the position data Xo and Yo and six photomultipliers surrounding the above photomultiplier as shown in FIG. 8. Each analog switch is connected to nine or eight photomultipliers to select the output of one of the photomultipliers. Alphabets "a" to "g" associated with the photomultipliers of FIG. 8 indicate respective analog switches 74a to 74g to which the corresponding photomultipliers are connected. For example, the photomultipliers of Nos. 1, 9, 18, 21, 32, 36, 43, 46, and 55 to which the alphabet a is attached are connected to the analog switch 74a, and the photomultipliers of Nos. 2, 10, 12, 22, 33, 37, 47, 56, and 57 to which the alphabet b is attached are connected to the analog switch 74b. Assuming that output signals Xo and Yo of the first position detector specify photomultiplier of No. 7, then the analog switches 74a to 74g respectively select photomultipliers Nos. 1, 2, 6, 7, 8, 13, and 14. In other cases, the seven photomultipliers forming a hexagonal block are selected in the same manner as described above.

Outputs of the seven photomultipliers supplied via the analog switches 74a to 74g are input to OR circuits 76l, 76m, and 76n. The OR circuits 76l, 76m, and 76n respectively select those of the seven photomultipliers which belong to the Ll group, Mm group, and Nn group, respectively, and pass the outputs of the selected photomultipliers. Assuming that the approximate position in the above example corresponds to the No. 7 photomultiplier, then the OR circuit 76l selects the photomultipliers of Nos. 2, 7, and 13, the OR circuit 76m selects the photomultipliers of Nos. 6, 7, and 8, and the OR circuit 76n selects the photomultipliers of Nos. 1, 7, and 14.

Outputs of the OR circuits 76l, 76m, and 76n are supplied to comparators 80l, 80m, and 80n via A/D converters 78l, 78m, and 78n and compared with the reference value Vref in the same manner as in the case of the first position detector shown in FIG. 6. The comparators 80l, 80m, and 80n respectively supply the signal to encoders 82l, 82m, and 82n when the input signal is larger than the reference signal Vref.

Outputs of the encoders 82l, 82m, and 82n are respectively supplied to L, M, and N position detectors 84l, 84m, and 84n. Each position detector 84 includes a numerator calculator 90 and a denominator calculator 92. The numerator calculator 90 and the denominator calculator 92 respectively calculate the numerator and denominator such as shown in Equation (3). In this case, three photomultipliers in one direction are used for calculation.

Figure 10A:
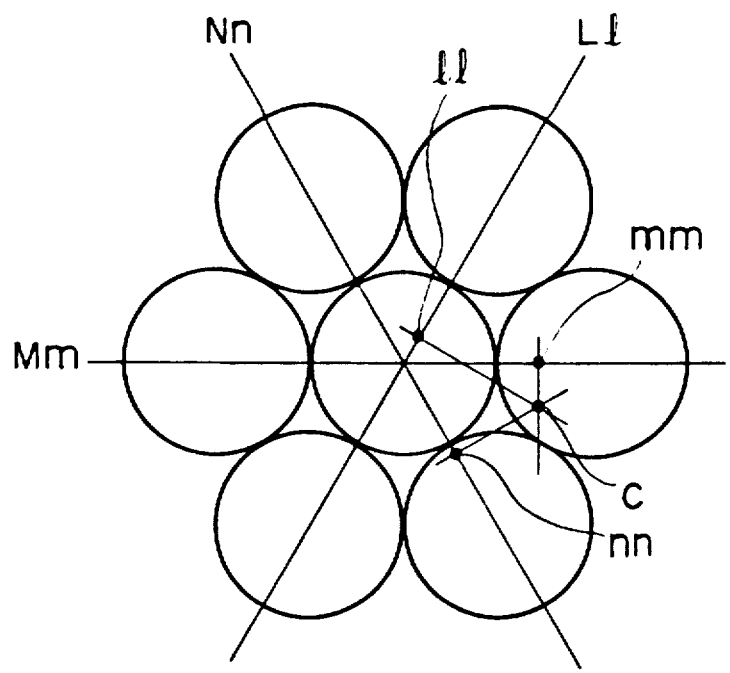
FIGS. 10A and 10B show the principle of detection of the second position detector.
Figure 10B:
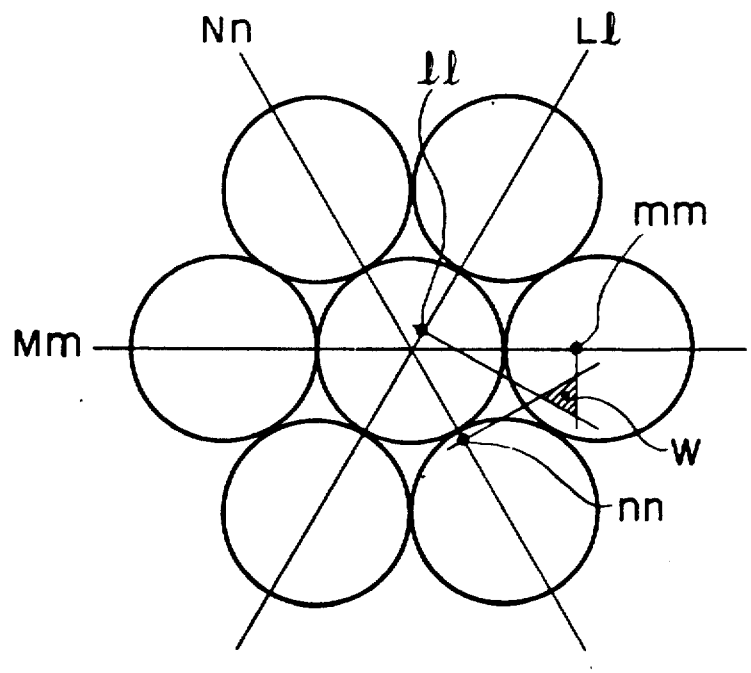

Now, the principle of detection by the second position detector 26 is explained with reference to FIGS. 10A and 10B. Output signals of the seven photomultipliers selected by approximate position signals Xo and Yo are selectively supplied to L, M, and N position detectors 84l, 84m, and 84n by means of the encoders 82l, 82m and, 82n. The divider 86 effects the division of the numerator/denominator output from the position detectors 84l, 84m, and 84n so as to determine positions ll, mm, and nn of the incident gamma ray in the respective groups Ll, Mm, and Nn as shown in FIG. 10A. The coordinate converter 88 calculates perpendiculars from the points ll, mm, and nn to the direction of groups Ll, Mm, and Nn and obtains an intersection point C of the perpendiculars as the finally determined precise incident position (x, y) of the incident gamma ray. As shown in FIG. 10B, when the three perpendiculars do not intersect at one point, the center of gravity W of a triangle formed by the three perpendiculars is used instead of the intersection C. The operation of the second position detector 26 is shown by the flowchart of FIG. 11.

The operation of the embodiment is explained. A gamma ray radiated from a test subject previously dosed with a radioisotope is detected by the detector 12. Electrical signals corresponding to the incident position of the gamma ray are output from the output terminals of the photomultipliers 18 of the detector 12. The pulse height of the electrical output signal generated from the photomultiplier 18 that is located nearest to the gamma ray incident position is larger than that of the other photomultipliers. The electrical output signals from the photomultipliers 18 are amplified by the preamplifiers 22 and then supplied to the first position detector 24.

A gamma ray detection signal input to the first position detector 24 is received by the L, M, and N group position detectors 52, 54, and 56 shown in FIG. 6. The input signals are collected by the OR circuits 62 in the detector and then converted into digital signals by the A/D converter 64. The digital signals are selectively classified according to the signal level by means of the comparator 66 and finally output as position signals l, m, and n with regard to the L, M, and N axes by means of the encoder 68. The coordinate converter 60 receives the position signals l, m, and n and the group selection signal to derive the coordinate values Xo and Yo of the photomultiplier on which the gamma ray is incident and outputs the same.

In this way, the approximate incident position signals Xo and Yo output from the first position detector 24 are supplied to the second position detector 26. In the second position detector 26, the decoder 72 controls seven analog switches 74a to 74g so as to select a hexagonal block of seven photomultipliers including a photomultiplier which lies in the position defined by the coordinate position signals Xo and Yo and six photomultipliers surrounding the above photomultiplier in response to the position signals Xo and Yo. Outputs of the photomultipliers of one block thus selected are divided into signals in respective directions along the three groups Ll, Mm, and Nn by means of the OR circuits 76l, 76m, and 76n. The respective signals are processed by the numerator calculator 90, denominator calculator 92, and divider 86 for each group to derive gamma ray incident positions ll, mm and nn (FIG. 10A). The coordinate converter 88 calculates perpendiculars from the points ll, mm, and nn and outputs an intersection point C of the perpendiculars as the finally determined precise incident position (x, y) of the incident gamma ray.

As described above, according to this invention, the approximate incident position of the incident radiation ray is derived by the first position detector and then the precise incident position is determined based on output signals of a block of photomultipliers including and surrounding the approximate incident position thus derived. Therefore a precise incident position is derived even when a plurality of radiation rays are generated at the same time and a high quality RI distribution image which is useful for diagnosis can be obtained.

This invention is not limited to the above embodiment and can be variously modified without departing from the technical scope thereof. For example, division of the photomultipliers into groups for deriving the approximate incident position may also be effected by dividing the photomultipliers with regard to two orthogonal coordinate axes X and Y as shown in FIG. 12. In the above embodiment, a photomultiplier block formed to derive a precise incident position is formed of seven photomultipliers arranged in a hexagonal configuration. However, it is also possible to constitute the photomultiplier block by nine photomultipliers arranged in a diamond configuration as shown in FIG. 13.

Additional advantages and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

What is claimed is:

1. A gamma camera device comprising:

means for receiving a radiation ray from a test subject dosed with a radioisotope, the receiving means generating scintillation light according to the received radiation ray;

a plurality of photomultipliers optically coupled with said radiation ray receiving means, for generating electrical signals in response to the scintillation light;

first position detection means for detecting one of said plurality of photomultipliers nearest to the point of incidence of the radiation ray in accordance with the electrical signals generated by said plurality of photomultipliers; and second position detection means for detecting a precise position on said radiation ray receiving means where the radiation ray is incident in accordance with the electrical signals generated by a block of photomultipliers, said block including the photomultiplier that is detected by said first position detection means and a predetermined number of photomultipliers located around said detected photomultiplier.

2. A device according to claim 1, wherein said plurality of photomultipliers are classified into a plurality of groups of photomultipliers; and said first position detection means compares the output from each of said groups of photomultipliers with a plurality of the remaining groups to detect a photomultiplier group that has the largest output level, and detects said one photomultiplier nearest to the point of incidence of the radiation ray in accordance with the position of the photomultiplier group having the largest output level.

3. A device according to claim 1, wherein said plurality of photomultipliers are arranged in a hexagonal configuration and classified into groups corresponding to three coordinate axes that intersect each other at an angle of 120°; and said first position detection means detects three groups of photomultipliers which have the largest output levels, each of said three groups corresponding to a unique coordinate axis, and converts position coordinate data represented by said three groups of photomultipliers into orthogonal coordinate data.

4. A device according to claim 1, wherein said first position detection means detects a first photomultiplier located inwardly adjacent to a second photomultiplier when said second photomultiplier is nearest to the point of incidence of the radiation ray, said second photomultiplier being located at an outer edge of said plurality of photomultipliers.

5. A device according to claim 1, wherein said plurality of photomultipliers are arranged in a hexagonal configuration; and said second position detection means detects the precise position according to the outputs of the photomultiplier detected by said first position detection means and six photomultipliers surrounding the detected photomultiplier in a hexagonal configuration.

6. A device according to claim 1, wherein said plurality of photomultipliers are arranged in a diamond configuration; and said second position detection means detects the precise position according to the outputs of the photomultiplier detected by said first position detection means and eight photomultipliers arranged around the detected photomultiplier in a diamond configuration.

7. A device according to claim 3, wherein aid second position detection means detects the incident position of the radiation ray on said receiving means in the coordinate system formed by said three axes by calculating a weighted average of the outputs of the photomultipliers in reach of said three groups, and converts the incident position detected by said first means into the position in the X-Y coordinate system.

8. A device according to claim 7, wherein aid second position detection means includes means for calculating a point on each of said three axes corresponding to said weighted average, calculating three perpendicular liens at each of said points, and calculating the incident position at the intersection of said three perpendicular lines.

9. A device according to claim 7, wherein said second position detecting means includes means for calculating a point on each of said three axes corresponding to said weighed average, calculating three perpendicular liens at each of said points, and calculating the incident position at the center of gravity of a triangle formed by said three perpendicular lines.

* * * * *

UNITED STATES PATENT AND TRADEMARK OFFICE
CERTIFICATE OF CORRECTION

PATENT NO. : 5,118,948
DATED : June 02, 1992
INVENTOR(S) : Yukinobu Ito et al.

It is certified that error appears in the above-identified patent and that said Letters Patent is hereby corrected as shown below:

Claim 7, column 9, line 19, change "aid" to --said--.

Claim 7, column 10, line 4, change "reach" to --each--.

Claim 8, column 10, line 7, change "aid" to --said--.

Claim 8, column 10, line 10, change "liens" to --lines--.

Claim 9, column 10, line 16, change "weighed" to --weighted--.

Claim 9, column 10, line 16, change "liens" to --lines--.

Signed and Sealed this

Twenty-sixth Day of October, 1993

*Attest:*

BRUCE LEHMAN

*Attesting Officer*        *Commissioner of Patents and Trademarks*